(12) United States Patent
Luijben et al.

(10) Patent No.: US 8,262,044 B2
(45) Date of Patent: Sep. 11, 2012

(54) DEVICE SUITABLE FOR SECURING AN OBJECT TO A WALL

(75) Inventors: Stefan Arthur Luijben, Helmond (NL); Paul Robbert Grolle, Helmond (NL)

(73) Assignee: Vogel's Holding B.V., Eindhoven (NL)

( * ) Notice: Subject to any disclaimer, the term of this patent is extended or adjusted under 35 U.S.C. 154(b) by 374 days.

(21) Appl. No.: 12/689,768

(22) Filed: Jan. 19, 2010

(65) Prior Publication Data

US 2010/0187385 A1 Jul. 29, 2010

(51) Int. Cl.
*E04G 3/00* (2006.01)

(52) U.S. Cl. .................. 248/276.1; 248/284.1; 248/920; 248/922; 248/923

(58) Field of Classification Search ............... 248/276.1, 248/274.1, 371, 286.1, 284.1, 291.1, 281.1, 248/285.1, 917, 919, 920, 921, 922, 923; 403/326, 327, 329, 325, 321
See application file for complete search history.

(56) References Cited

U.S. PATENT DOCUMENTS

| | | | |
|---|---|---|---|
| 2,935,286 A | 5/1960 | Parsons | |
| 6,554,242 B2 * | 4/2003 | Kim | 248/371 |
| 7,063,295 B2 | 6/2006 | Kwon | |
| 7,270,309 B2 | 9/2007 | Burns et al. | |
| 7,537,189 B2 * | 5/2009 | Jung et al. | 248/298.1 |
| 7,738,269 B2 * | 6/2010 | Goto et al. | 363/41 |
| 7,871,048 B2 * | 1/2011 | Sculler et al. | 248/220.21 |
| 7,963,489 B2 * | 6/2011 | O'Keene et al. | 248/201 |
| 2006/0231711 A1 * | 10/2006 | Shin | 248/291.1 |
| 2007/0007413 A1 * | 1/2007 | Jung et al. | 248/284.1 |
| 2007/0235614 A1 | 10/2007 | O'Keene et al. | |
| 2007/0262215 A1 * | 11/2007 | Tan | 248/201 |
| 2008/0156949 A1 * | 7/2008 | Sculler et al. | 248/220.21 |
| 2008/0308697 A1 * | 12/2008 | Woods et al. | 248/231.91 |
| 2009/0278011 A1 * | 11/2009 | Luijben et al. | 248/284.1 |
| 2010/0309615 A1 * | 12/2010 | Grey et al. | 361/679.01 |

FOREIGN PATENT DOCUMENTS

| | | |
|---|---|---|
| DE | 3915514 | 11/1990 |
| DE | 19963380 | 7/2001 |
| DE | 102004023679 | 12/2004 |
| DE | 202005019637 | 5/2006 |
| DE | 202006011519 | 11/2006 |
| EP | 1559947 | 8/2005 |

OTHER PUBLICATIONS

European Search Report of EP Ser. No. 09000907.7 dated May 29, 2009.
German Search Report of DE Ser. No. 202009000978.5 dated Jun. 26, 2009.
Amended Written Opinion for EP Ser. No. 09000907.7 dated Jul. 22, 2009.

* cited by examiner

*Primary Examiner* — Ramon Ramirez
(74) *Attorney, Agent, or Firm* — Rankin Hill & Clark LLP

(57) ABSTRACT

A device is suitable for securing an object to a wall. The device comprises a wall element to be fixed to a wall and a support element to be connected to the object. On a first side, the support element is provided with a first hook-shaped element, which, in use, can be attached to a receiving element provided in the wall element. On a second side remote from said first side, the support element is provided with a second hook-shaped element, which, in use, is in spring-loaded engagement with a second receiving element provided in the wall element. The device comprises a locking element for locking the second hook-shaped element in a locking position in a position in which it is disconnected from the wall element.

11 Claims, 18 Drawing Sheets

DEVICE SUITABLE FOR SECURING AN OBJECT TO A WALL

BACKGROUND

The invention relates to a device suitable for securing an object to a wall, which device comprises a wall element to be fixed to a wall and a support element to be connected to the object, which support element is provided with a first hook-shaped element on a first side thereof, which, in use, can be attached to a first receiving element provided in the wall element, which support element is provided with a second hook-shaped element on a second side remote from said first side, which second hook-shaped element can be moved in a direction towards the first hook-shaped element under spring force, and which, in use, is in spring-loaded engagement with a second receiving element provided in the wall element.

The invention also relates to a wall element and to a support element suitable for such a device.

In such a device, which is known from DE-U1-20.2006.011.519, the support element is a guitar support, to which an object such as a guitar can be detachably connected. When the guitar support is to be disconnected from the wall, the second hook-shaped element must be moved in a direction away from the first hook-shaped element against spring force. A user can do this with one hand. With the other hand, the user holds the relatively light guitar support. When the guitar support is being removed from the wall, the guitar is not connected to the guitar support, so that there is no risk of the guitar being damaged.

However, if the object connected to the support element does remain connected to the support element upon removal of the support element, and the object is relatively costly or relatively heavy, a user can only use one hand for holding the object and the support element in the case of the known device, because he or she needs the other hand for disconnecting the second hook-shaped element. This is made even more difficult if several second hook-shaped elements are used. Such a situation occurs, for example, if the device is used for hanging a display screen on a wall.

In a device known from U.S. Pat. No. 7,063,295, the wall element is provided with a plate to be fixed to a wall, to which two U-shaped sections. which are tiltable about a tilt axis, are attached. On a side remote from said tilt axis, each U-shaped section has an edge which functions as a first receiving element for a support element to be connected to the display screen. At the bottom side, each U-shaped section is provided with a slide provided with a recess, which can be moved against spring force in a direction away from the first receiving element. Near the slide, the U-shaped section is provided with an opening located opposite the recess in the slide.

The known device further comprises two support elements, which are each provided with a first hook-shaped element near an upper side, as well as with a second hook-shaped element located near the bottom side. After the support elements have been connected to the display screen, the first hook-shaped elements are brought into engagement with the edges at the upper side of the U-shaped sections, whereupon the second hook-shaped elements are pressed through the openings in the U-shaped sections into the recesses present in the slides. The slides are first pushed in downward direction against spring force, whereupon the slides are moved in a direction towards the first receiving elements under spring force after the hook-shaped elements have been moved sufficiently far through the recesses. As a result, the second hook-shaped elements of the support elements are interlocked with the U-shaped sections of the wall element.

A drawback of the device that is known from U.S. Pat. No. 7,063,295 is that the second hook-shaped elements need to be precisely aligned with the recesses in the slide in order to make it possible to bring the second hook-shaped elements into engagement with the slides. Consequently, the first hook-shaped elements must to that end also be precisely aligned with the first receiving elements. Moreover, the device is relatively complex on account of the presence of a slide as well as a second hook-shaped element.

BRIEF DESCRIPTION

The object of the invention is to provide a device for securing an object to a wall in a simple manner.

This object is accomplished with the device according to the invention in that the device comprises a locking element for locking the second hook-shaped element in a locking position in a position in which it is disconnected from the wall element.

When the support element is being disconnected from the wall element, the second hook-shaped element is moved against spring force in a direction away from the first hook-shaped element, as a result of which the engagement with the second receiving element is released. Placing the second hook-shaped element in the locking position makes it possible in a simple manner to prevent the second hook-shaped element from coming into engagement with the second receiving element again when the object, for example a display screen, is taken hold of in order to lift the first hook-shaped element off the first receiving element.

When the support element is being connected to the wall element (the device may comprise a number of support elements, if desired), the first hook-shaped element is brought into engagement with a first receiving element provided in the wall element. Said receiving element may be considerably wider than the first hook-shaped element, as a result of which the first hook-shaped element can be easily connected to the first receiving element. As a result, there is no need to position the support element precisely with respect to the wall element. The second hook-shaped element is then moved against spring force in a direction away from the first hook-shaped element, so that it can be brought into engagement with the second receiving element. Subsequently, the second hook-shaped element is moved against spring force in a direction towards the first hook-shaped element, thereby realising the engagement with the second receiving element. The second receiving element may be relatively wide as well, so that there is no need to align the second hook-shaped element relative to the second receiving element. Since the second hook-shaped element can be moved towards the first hook-shaped element under spring force, a separate movable slide accommodated in the wall element, as in the device known from U.S. Pat. No. 7,063,295, is not needed. This leads to a relatively simple construction of the device according to the invention.

One embodiment of the device according to the invention is characterised in that the hook-shaped element can be connected to a pull element for moving the second hook-shaped element against spring force in a direction away from the first hook-shaped element.

Using the pull element, the second hook-shaped element can be moved out of engagement with the second receiving element against spring force. Then the first hook-shaped element can be removed from the first receiving element. The support element can thus be disconnected from the wall element in a simple manner.

Yet another embodiment of the device according to the invention is characterised in that the first and/or the second receiving element comprise(s) an elongate edge, with which the hook-shaped element is in engagement in use, the length of said elongate edge being at least twice the width of the hook-shaped element.

The elongate edge makes it possible to place the object, for example a display screen, in a desired position relative to the wall element after the wall element has been fixed to the wall. The fixation of the wall element to the wall need not take place with a high degree of precision, as the position desired by the user is only realised when the object with the support element is being attached to the wall element. If desired, a user can subsequently change said position within the limits of the length of the elongate edge.

Yet another embodiment of the device according to the invention is characterised in that the second hook-shaped element comprises a slide which is mounted for sliding as well as tilting movement with respect to the support element, which slide is movable from a first position, in which it is disconnected from the wall element, to a second position, in which it is connected to the second receiving element, and vice versa, in which first position the slide is spaced from the first hook-shaped element and tilts towards the wall element under spring force, whilst in the second position the slide tilts away from the wall element and is positioned closer to the first hook-shaped element.

Such a hook-shaped element is of relatively simple design.

Yet another embodiment of the device according to the invention is characterised in that the slide is provided with a tilt pin which is slidably supported in a slot in the support element, which slot extends towards the first hook-shaped element, which slide is further provided with an L-shaped slot, in which a guide pin connected to the support element is accommodated, which slide is tiltable about said tilt pin from the first position, in which the guide pin is located near a first end of said L-shaped slot, to a second position, in which the guide pin is located near a second end of the L-shaped slot, and vice versa.

Because of the slots and the tilt pin and the guide pin accommodated therein, a clearly defined movement of the slide with respect to the support element is realised and ensured.

Another embodiment of the device according to the invention is characterised in that the guide pin is positioned closer to the first hook-shaped element than the tilt pin, whilst a tension spring extends between the tilt pin and the guide pin.

The tension spring that extends between the guide pin and the tilt pin exerts a pulling force on the slide in the direction of the first hook-shaped element.

Another embodiment of the device according to the invention is characterised in that the second hook-shaped element comprises a slide which is movable under spring force in a direction of movement towards the first hook-shaped element, which slide is provided with a run-on surface which includes an angle with the direction of movement, wherein contact between the run-on surface and the second receiving element in use causes the slide to be moved in a direction opposite the direction of movement until the run-on surface is located on a side of the second receiving element remote from the support element, whereupon the slide is moved towards the first hook-shaped element under spring force and brought into engagement with the second receiving element.

Since the run-on surface includes an angle with the direction of movement, a force will be exerted on the run-on surface in a direction away from the first hook-shaped element when the run-on surface is being moved and pressed against the second receiving element, as a result of which the run-on surface, and consequently the slide, will be moved away from the first hook-shaped element. By subsequently moving the run-on surface further in a direction towards the receiving element, the run-on surface will be positioned on a side of the second element remote from the support surface, after which the slide is brought into engagement with the second receiving element under spring force. Such a slide functions in the same manner as the slide of a doorhandle.

Yet another embodiment of the device according to the invention is characterised in that the second receiving element comprises an elongate strip, which is movably supported in the wall element, which strip is movable between a receiving position, in which the second hook-shaped element can be brought into engagement with the strip, to a releasing position, in which the second receiving element is out of engagement with the strip.

Such a strip makes it possible to release the connection between the second hook-shaped elements of a number of support elements and the wall element in a simple manner. The second receiving elements need not be moved against spring force in that case for disconnecting the second hook-shaped elements from the second receiving elements.

BRIEF DESCRIPTION OF THE DRAWINGS

The invention will now be explained in more detail with reference to the drawings, in which:

FIGS. 4A-C are perspective views of a second embodiment of a device according to the invention, in which FIG. 4A shows the second hook-shaped element being connected, FIG. 4B shows the second hook-shaped element in connected position and FIG. 4C shows the second hook-shaped element being disconnected;

DETAILED DESCRIPTION

Figure 1:
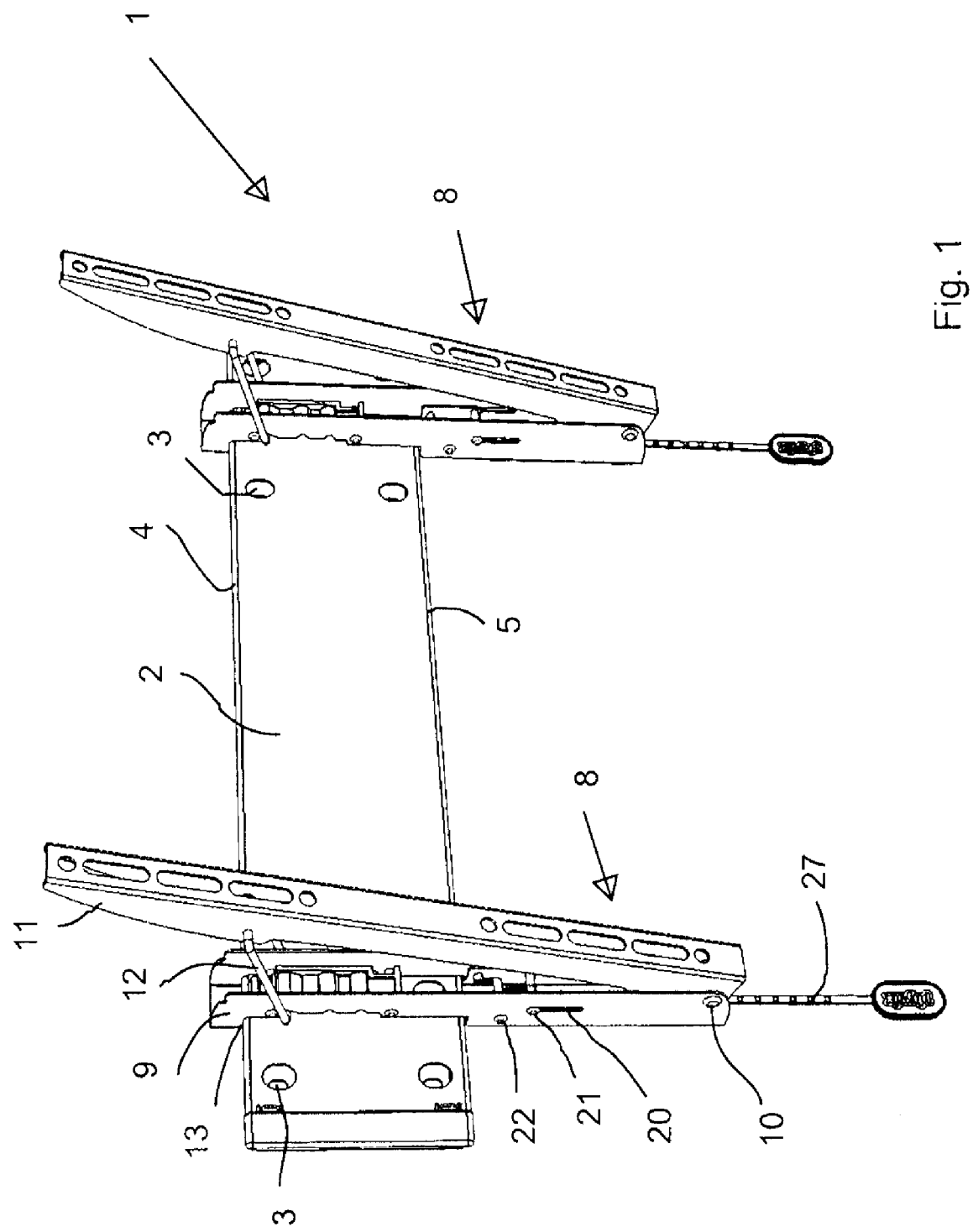
FIG. 1 is a perspective view of a first embodiment of the device according to the invention.

Like parts are indicated by the same numerals in the figures.

FIGS. 1-3B are views of a first embodiment of a device 1 according to the invention, which device 1 comprises an elongate wall element 2, which can be fixed to a wall via fixing holes 3. The wall element 2 has two parallel, horizontally extending edges 4, 5. As is clearly shown in FIG. 4A, the edge 4 has a surface 6 which is directed towards the wall and which includes an acute angle with the wall. Similarly, as is shown more clearly in FIG. 4A, the edge 5 has a surface which is directed towards the wall and which includes an acute angle with the wall. On account of the shape of the edges 4, 5, the spacing between the sides of the edges located near the wall is smaller than the spacing between the sides of the edges remote from the wall.

The device 1 further comprises two support elements 8, which are each provided with a support 9 connected to the wall element 2, and a section 11, which is connected to the support 9 in such a manner as to be tiltable about a tilt pin 10. At a position spaced from the tilt pin 10, the supports 9 and the section 11 are connected by means of a connecting arm 12, by means of which the angle between the section 11 and the support can be adjusted.

Figure 4A:
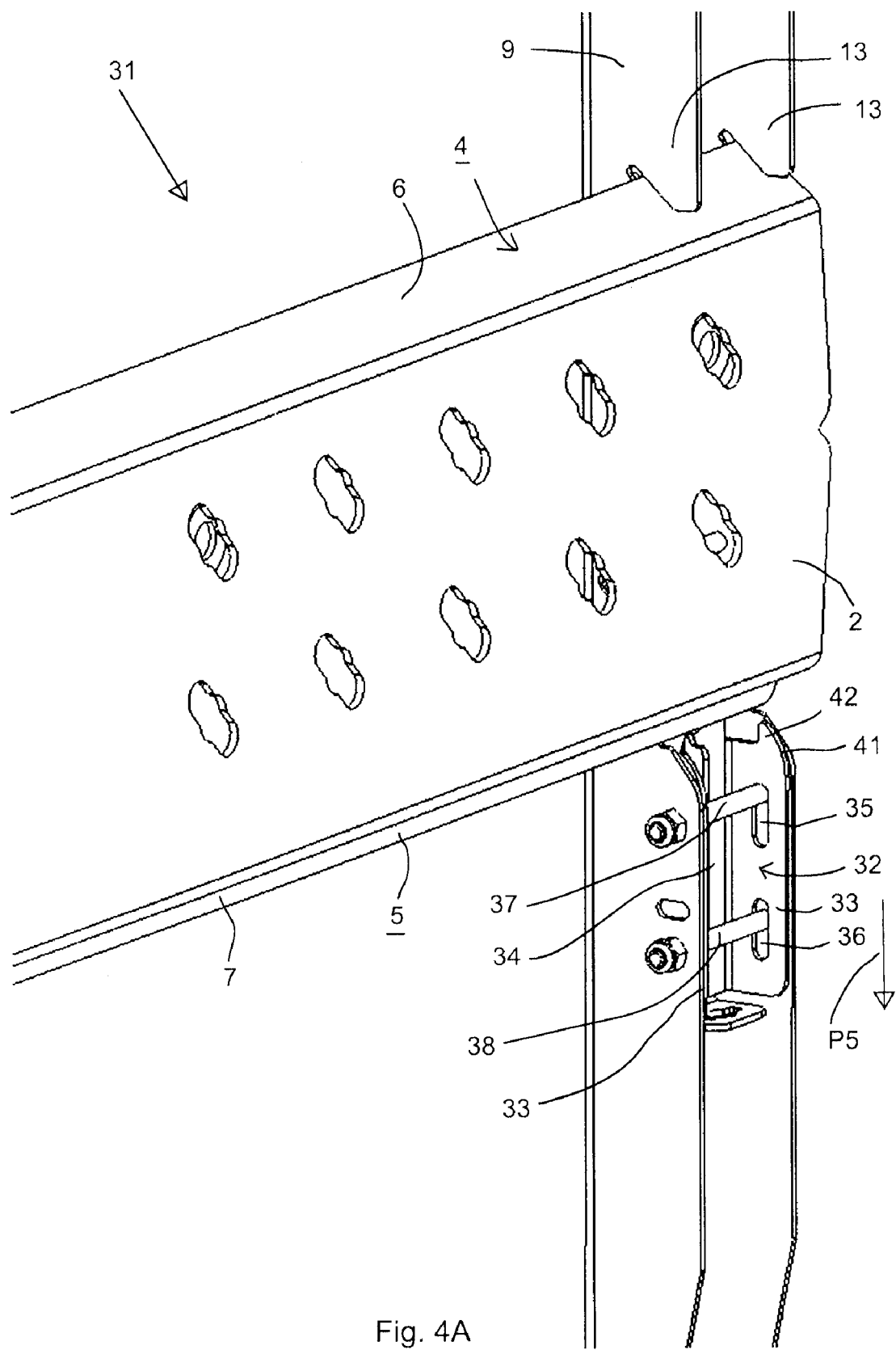

Near the upper side, the support 9 is provided with a first hook-shaped element 13, which, as is shown more clearly in FIG. 4A, engages around the edge 4, with the hook-shaped element 13 abutting against the surface 6.

Figure 2A:
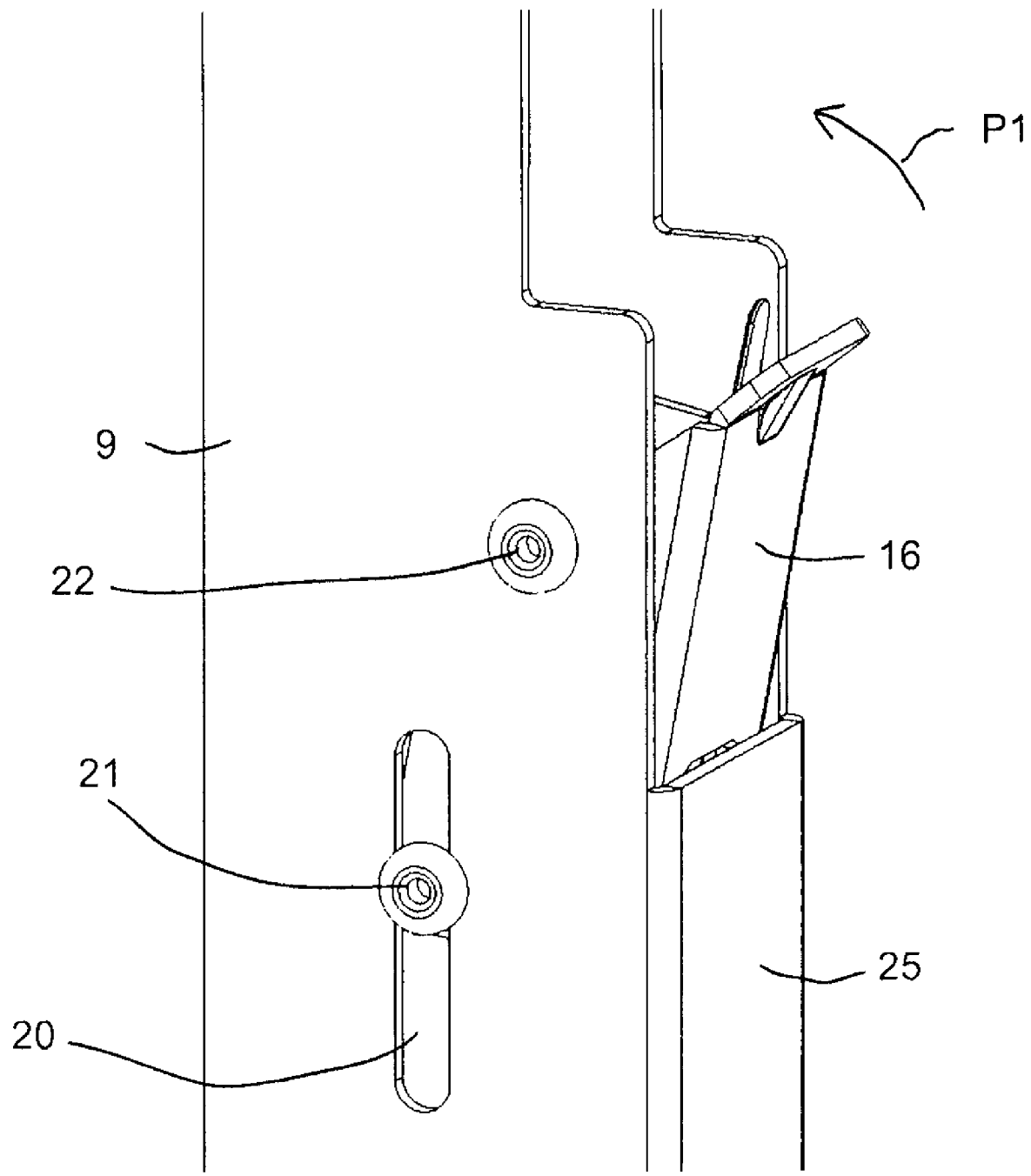
FIGS. 2A, 2B are perspective views of a second hook-shaped element of the device shown in FIG. 1 in a disconnected position thereof.
Figure 2B:
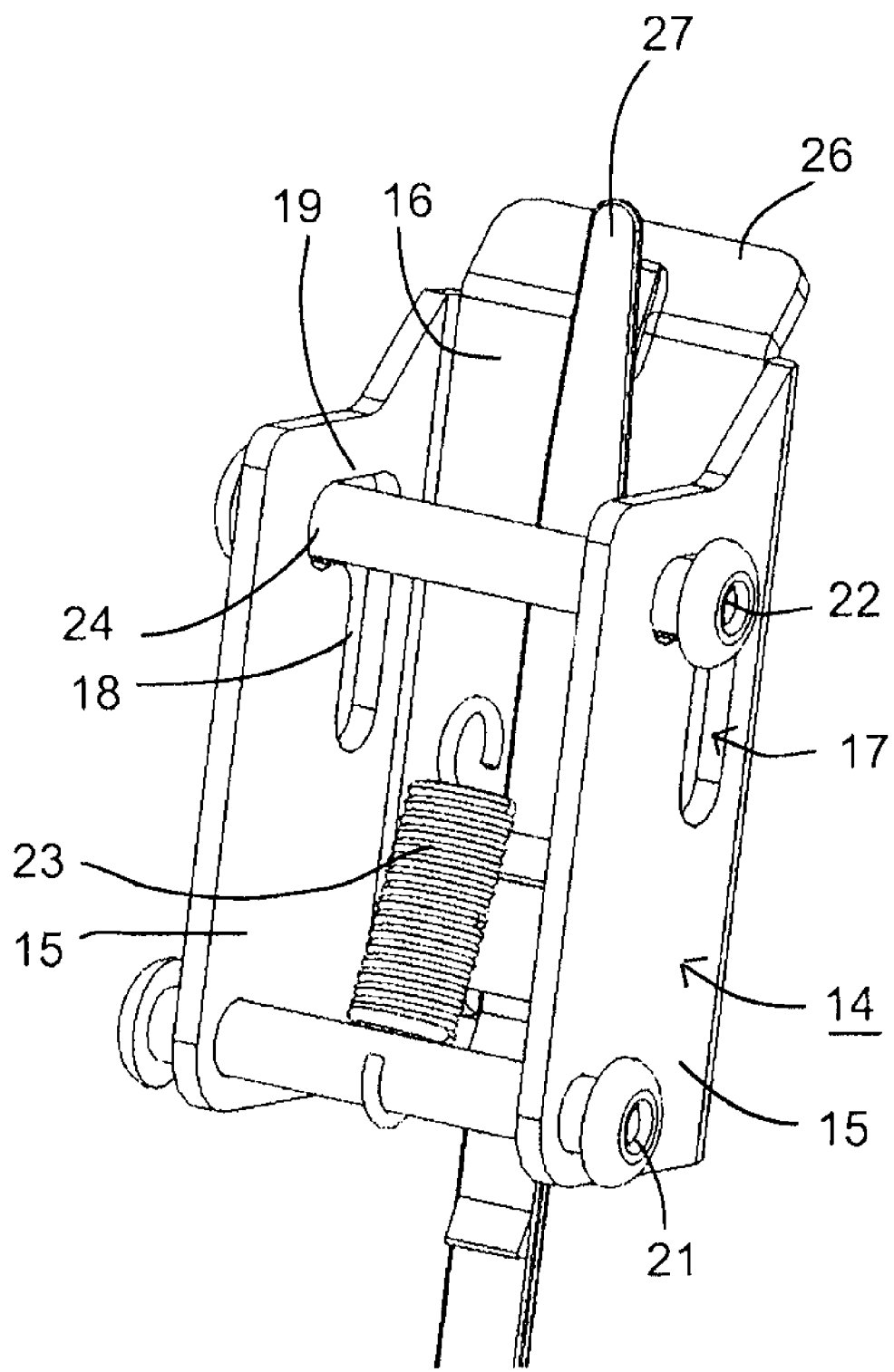
Figure 3A:
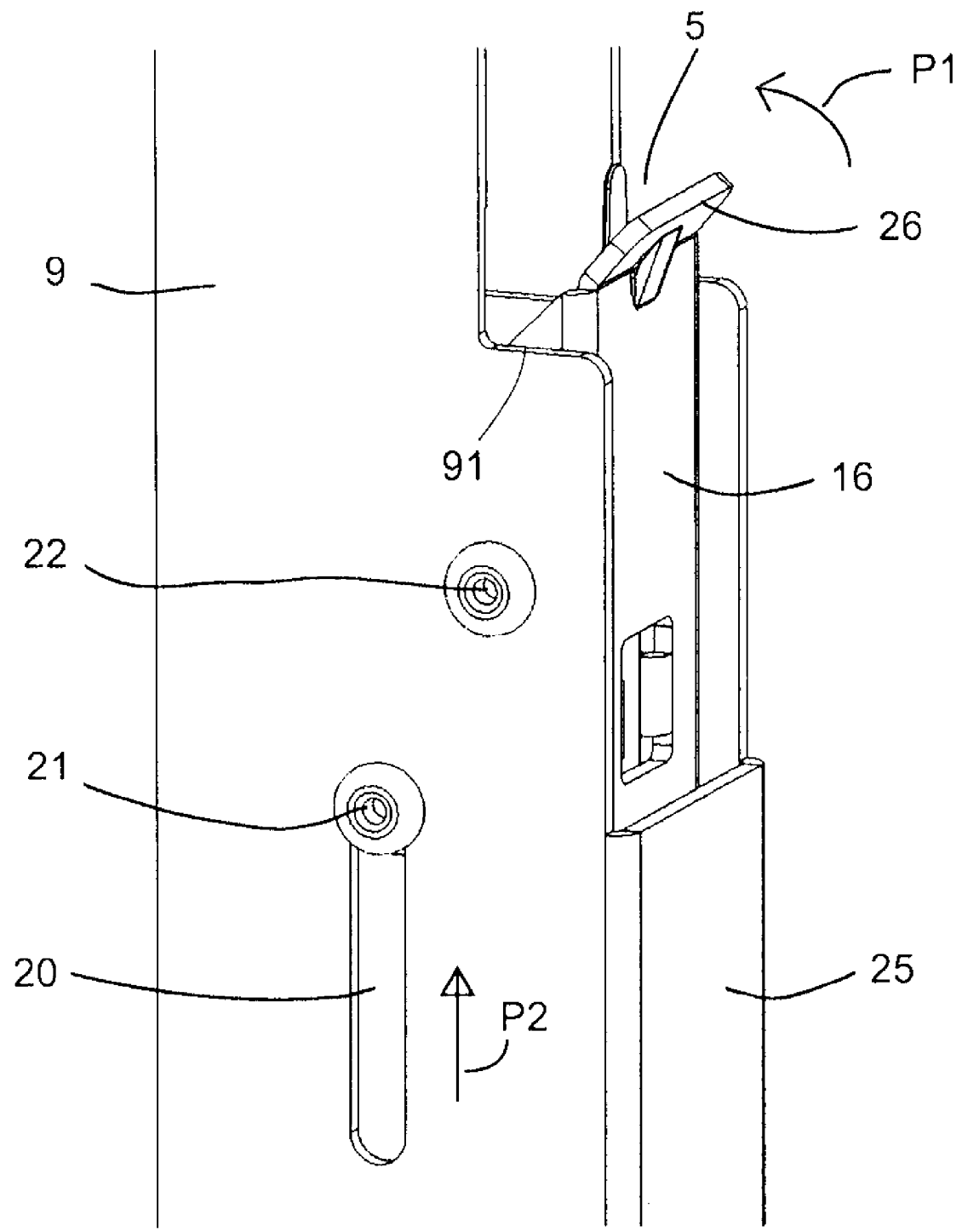
FIGS. 3A and 3B are perspective views of a second hook-shaped element of the device shown in FIG. 1 in a connected position thereof.
Figure 3B:
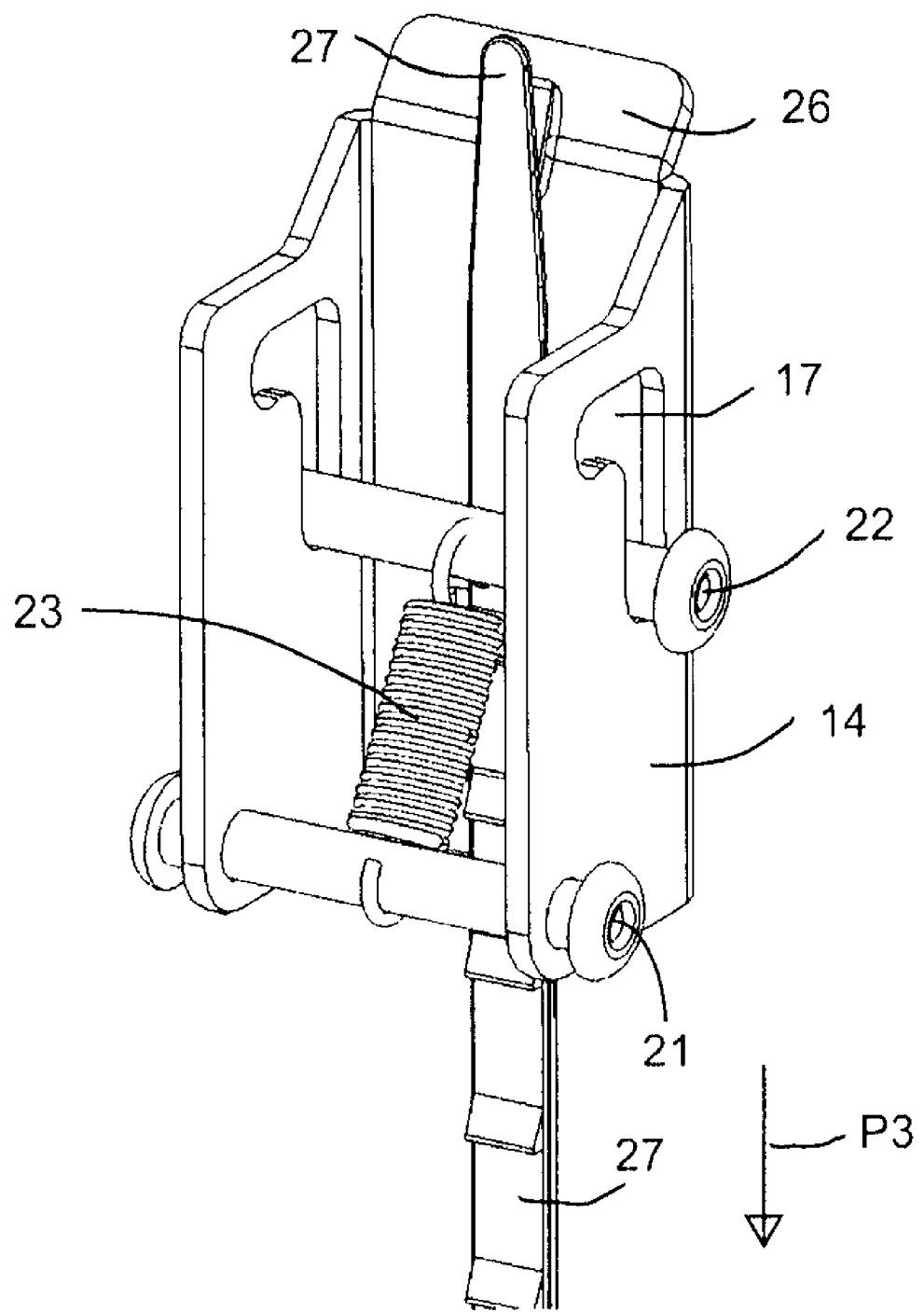

On a side remote from the first hook-shaped element 13, the support 9 is provided with a slide 14 (see FIGS. 2B, 3B). The slide 14 comprises two wall elements 15 extending parallel to each other and a wall element 16 extending therebetween. The two wall elements 15 are provided with L-shaped slots 17, which comprise a first recess 18, which extends in the longitudinal direction of the slide 14 and a second recess 19, which extends transversely thereto. The support 9 is provided with a slot 20, which extends in vertical direction towards the first hook-shaped element 13, in which a tilt pin 21 extending between the wall elements 15 of the slide 14 is movably accommodated. The support 9 further comprises a guide pin 22, which is positioned closer to the first hook-shaped element 13 of the support 9 than the tilt pin 21. The guide pin 22 extends through the slots 17 of the slide 14. A tension spring 23 extends between the guide pin 22 and the tilt pin 21. In FIG. 2B, the tension spring 23 is shown disconnected from the guide pin 22. In use, however, the tension spring 23 is connected to the guide pin 22, as is also shown in FIG. 3B. To secure an object, for example a display screen, to a wall, at least one support element 8, two support elements 8 in the present embodiment, is connected to a display screen. The sections 11 are to that end provided with recesses, through which bolts can be passed, for example. Each type of display screen, for example a plasma screen or an LCD screen, is provided with a pattern of mounting holes at the rear side, which pattern may vary with each type of display screen. Since the section itself is provided with a number of holes, it is possible to connect a section 11 to any display screen. The spacing between two adjacent sections 11 may vary per display screen, however. With the device according to the invention, this does not lead to problems, however. With the device as described above, which is known from the aforesaid US patent, the sections must be spaced apart by a distance which is determined by the wall element.

After the support element 8 has been connected to the display screen and the wall element 2 has been fixed to the wall, a user will take hold of the display screen and position the first hook-shaped elements 13 around the first receiving element 4, so that the display screen will be suspended from the edge 4. Since the edge is elongate in shape, the first hook-shaped elements 13 of the two supports 9 can be connected to the wall element 2 over a large area. It is not necessary, therefore, to align the hook-shaped elements 13 precisely with respect to the wall element 2. Before connecting the hook-shaped elements 13 to the edge 4 takes place, each slide 14 has been moved to the position shown in FIGS. 2A, 2B while extending and biassing the tension spring 23. In this position, the guide pin 22 abuts against an end 24 of the second recess 19 of the L-shaped slot 17. The slide 14 further takes up a tilted position, with the wall element 16 tilting away from the section 11, towards the wall element 2. In this position, the wall element 16 extends beyond a wall 25 of the support 9. After the first hook-shaped elements 13 have been brought into engagement with the edge 4, the bottom side of the display screen, and consequently also the bottom sides of the supports 9, is tilted in a direction towards the wall, as a result of which one end of a surface 26 of the wall element 16 will come into contact with the wall. Said end of the surface 26 will function as a stop. Further tilting of the display screen in the direction of the wall results in the slide 14 being tilted in the direction indicated by the arrow P1 about the tilt pin 21, with the second recess 19 of the L-shaped slot 17 being moved over the guide pin 22 until the guide pin 22 is positioned in the first recess 18. Once the guide pin 22 is positioned in the first recess 18, the tension spring 23 will exert a force on the tilt pin 21, and consequently on the slide 14, as a result of which the tilt pin 21 will be moved in the direction indicated by the arrow P2 in the slot 20, and the slide 14 connected to the tilt pin 21 will be moved towards the first hook-shaped element 13 (see FIGS. 3A and 3B). The surface 26, which, as a result of the tilting of the display screen, is already positioned against the wall and consequently extends beyond the edge 5, is now moved in the direction of the edge 4 and thus into engagement with the surface 7 of the edge 5. The surface 26 thus functions as a second hook-shaped element. The support 9 is now securely connected to the wall element 2. When the support 9 is moved in upward direction, for example by unauthorized persons, said movement will be limited by stops 91, which are spaced so close to the first hook-shaped element 13 that detaching the support 9 from the wall element 2 will not be possible.

When a user wishes to remove the display screen from the wall element 2, the user will exert a force in the direction indicated by the arrow P3 on a pull element 27 connected to each slide 14, as a result of which the slide 14 is moved to the disconnected position shown in FIGS. 2A, 2B. The bottom side of the display screen can then be tilted away from the wall element 2, whereupon the first hook-shaped elements 13 can be moved in upward direction and the engagement with the edge 4 is released.

Figure 4B:
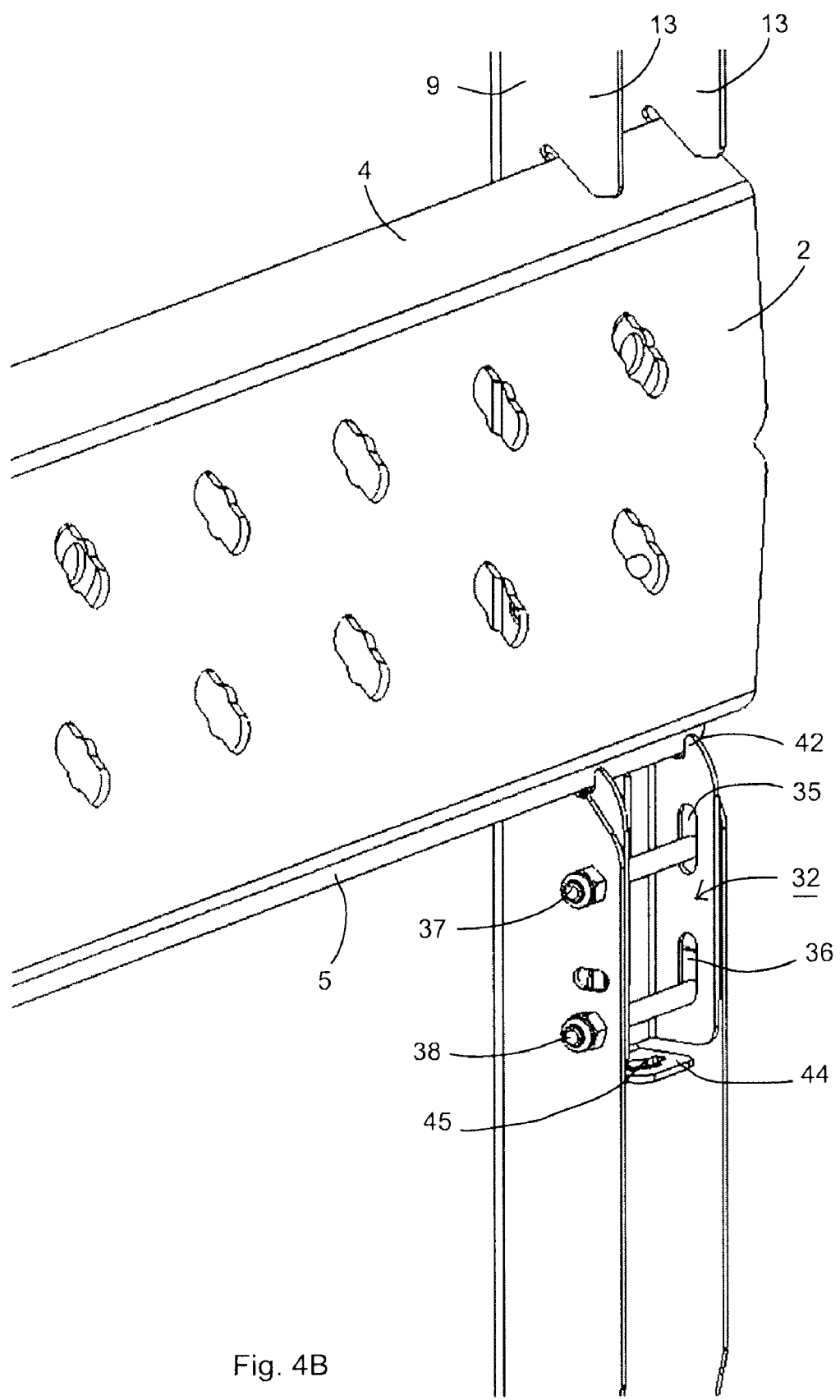
Figure 4C:
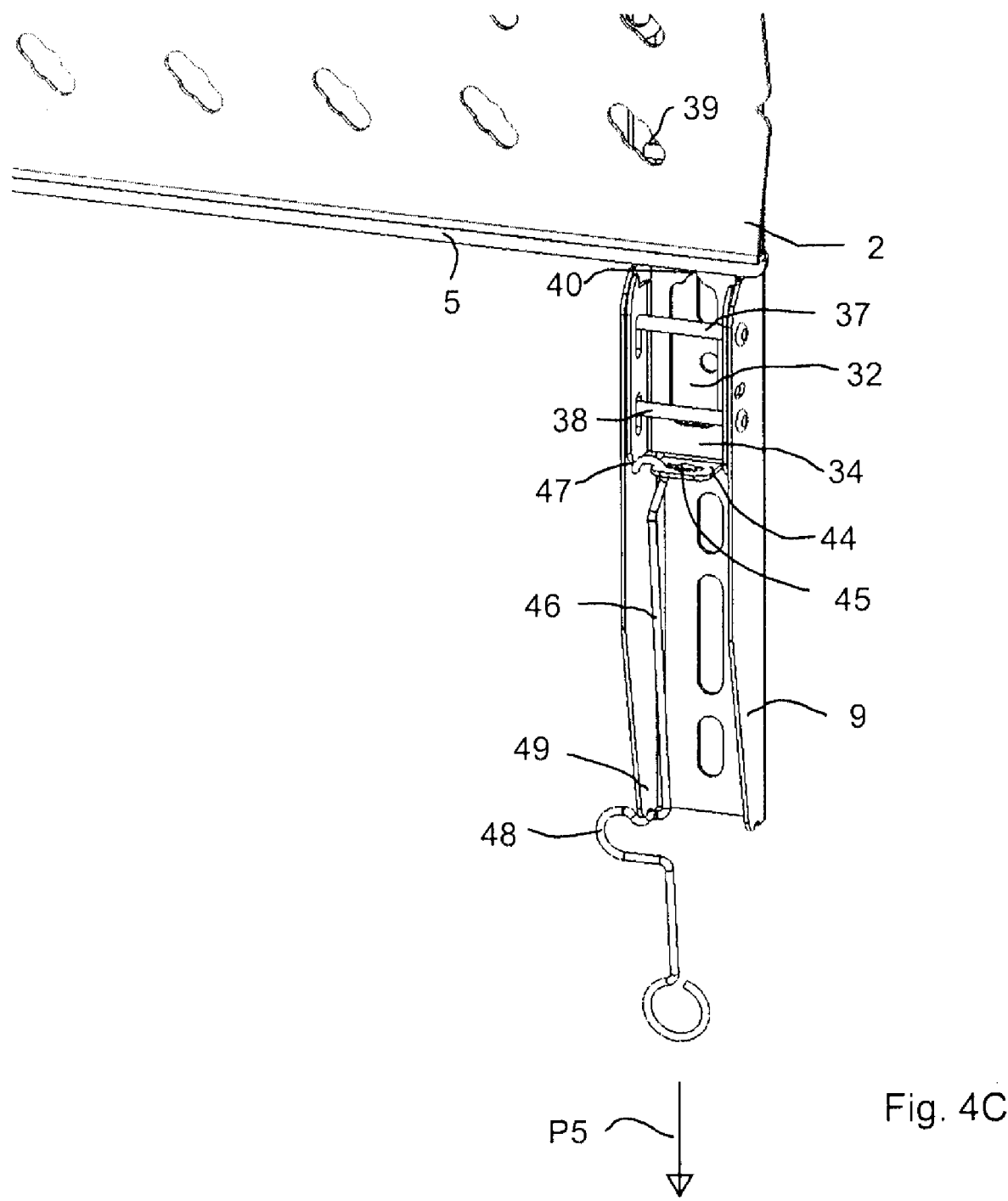
Figure 12:
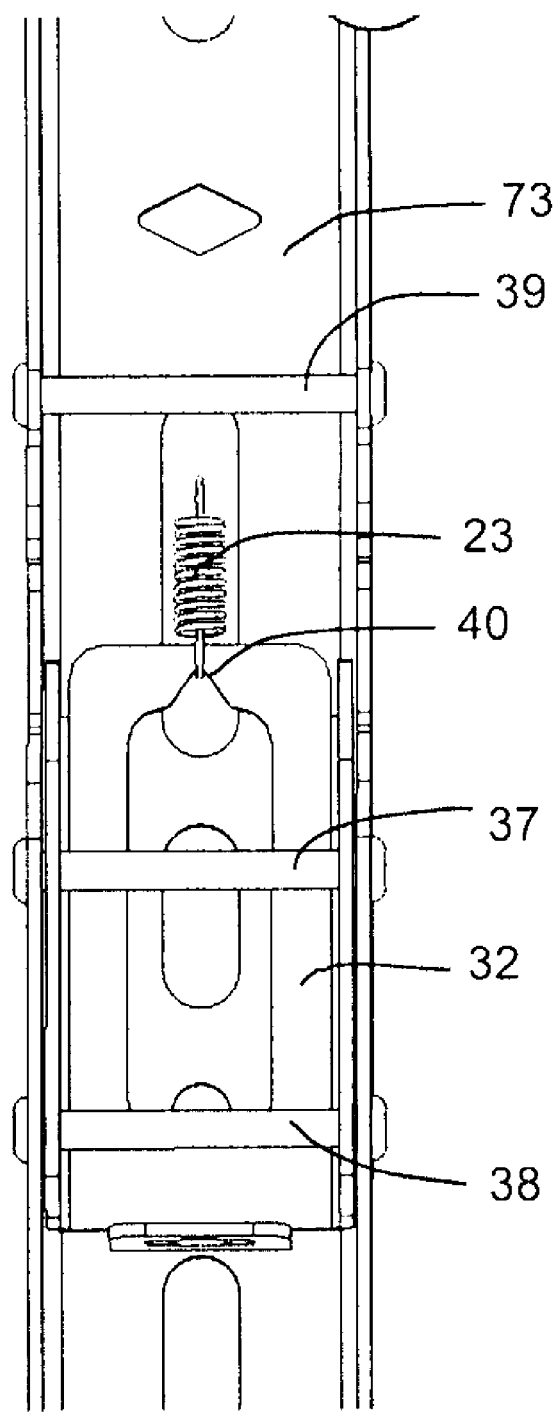
FIG. 12 is a rear view of the support element shown in FIG. 8.

FIGS. 4A-4C are perspective views of a second embodiment of a device 31 according to the invention. The device 31 is different from the device 1 in that the support 9 is directly connected to the display screen. The display screen cannot tilt about a tilt pin 10 relative to the wall element 2, therefore. The device 31 is furthermore different from the device 1 in that the wall element 2 comprises a differently configured slide 32. The slide 32 comprises two wall elements 33, which extend parallel to each other, and a wall element 34, which extends therebetween. The wall elements 33 are provided with two slots 35, 36 extending in vertical direction, in line with each other. Guide pins 27, 38 connected to the support 9 extend through said slots 35, 36. The support 9 further comprises a connecting pin 39, which is visible through a wall element 2 in FIG. 4C. Between the connecting pin 39 and a recess 40 of the wall element 34, a tension spring 23 extends (see FIG. 12). On a side facing the first hook-shaped element 13, the wall elements 33 are provided with run-on surfaces 41, which include an acute angle with the vertical. The wall elements 33 are further provided with vertically extending surfaces 42, which join the run-on surfaces 41 at the upper side.

To connect the support 9 to the wall element 2, the first hook-shaped element 13 is first moved into engagement with the surface 6 of the edge 4 in a position of the support 9 in which the support 9 is tilted relative to the wall element 2. The slide 32 now takes up a position near the first hook-shaped element 13, to which it has been moved by the tension spring 23. When subsequently the support 9 is tilted in the direction of the wall element 2, the run-on surfaces 41 come into contact with a side of the edge 5 remote from the surface 7. As a result of the run-on surfaces 41 being pushed against the edge 5, forces are exerted on the run-on surfaces 41 in the direction indicated by the arrow P5, as a result of which the slide 32 will be moved in the direction indicated by said arrow P5. Once the run-on surfaces 41 get beyond the bottom side of the surface 7 of the edge 5, the slide 32 will be moved in the opposite direction of the arrow P5 under the influence of the force exerted by the tension spring 23, during which movement the surfaces 42 come into contact with the surface 7 of the edge 5. The support 9 is now securely connected to the wall element 2 (see FIG. 4B).

The slide 32 is provided with a lip 44 extending transversely to the wall element 34, in which a recess 45 is present. To disconnect the support 9 from the wall element 2, a user will bring a detachable pull rod 46 (FIG. 4C), which is provided with a hook 47 at one end, into engagement with the lip 44 via the recesses 45. The user will then exert a pulling force in the direction indicated by the arrow P5 on the pull rod 46, and consequently on the slide 32, as a result of which the slide 32 will be moved to the position shown in FIG. 4C. In this position, a bent-over part 48 of the pull rod 46 engages an underside 49 of the support 9, thereby placing the slide 32 in a locking position, from which the slide 32 can no longer be undesirably reconnected to the wall element 2. Following that, the support 9 can be tilted over the first hook-shaped element 13, away from the wall element 2, and be lifted from said wall element.

Figure 5:
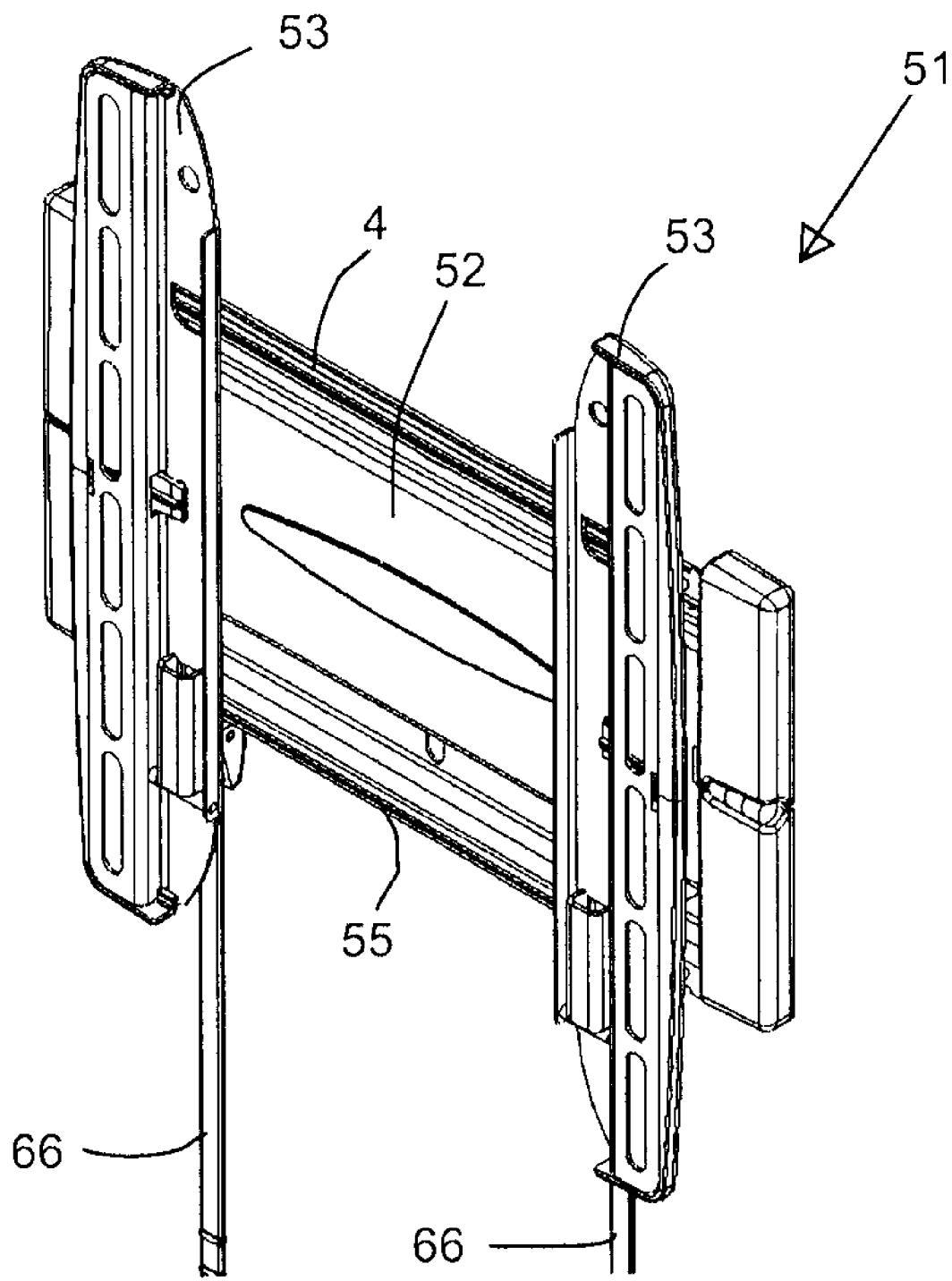
FIG. 5 is a perspective view of a third embodiment of a device according to the invention.
Figure 6A:
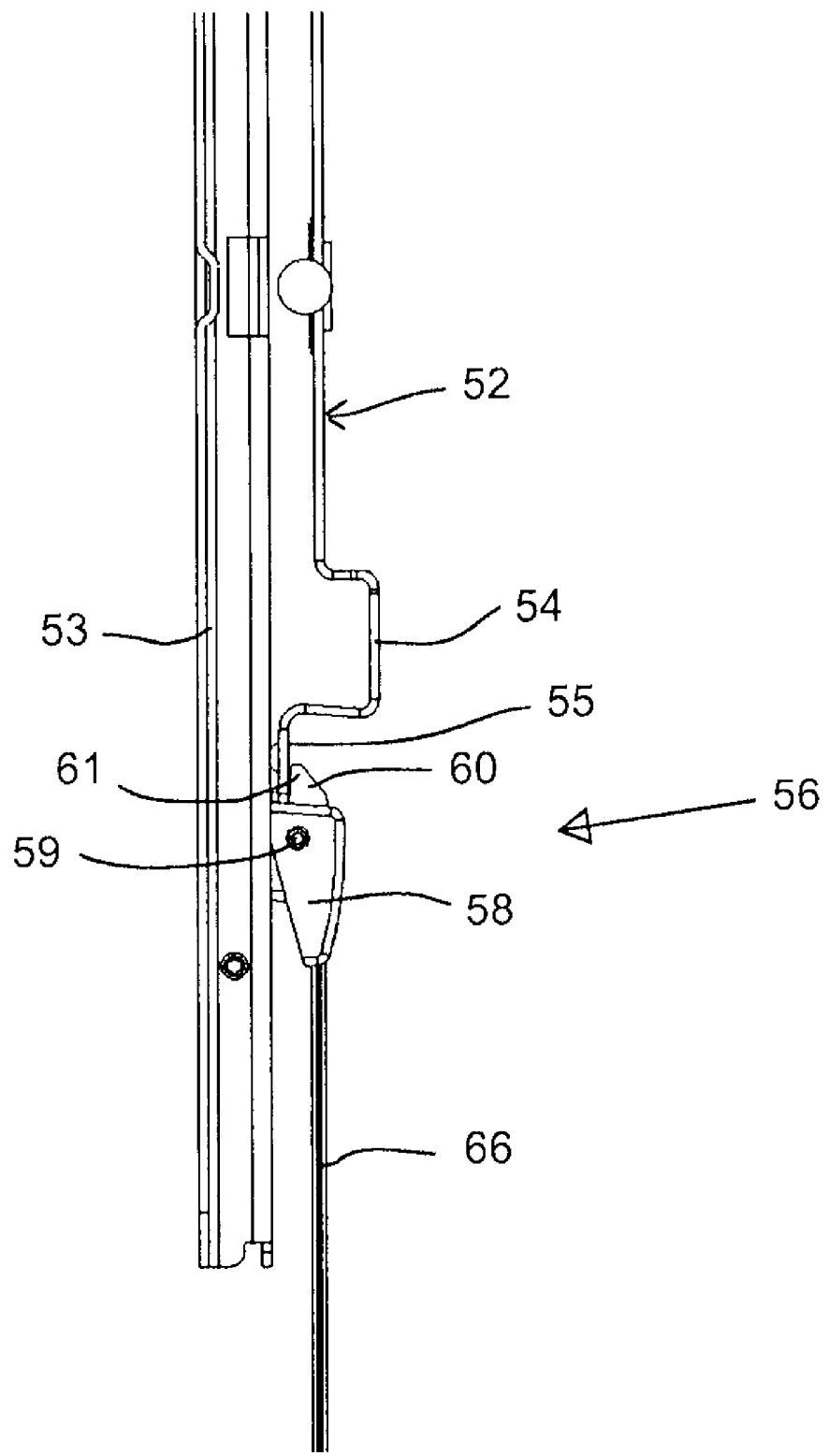
FIGS. 6A-C are a side view, a larger-scale side view and a perspective view, respectively, of a detail of the device shown in FIG. 5 in a connected position of the second hook-shaped element.
Figure 6B:
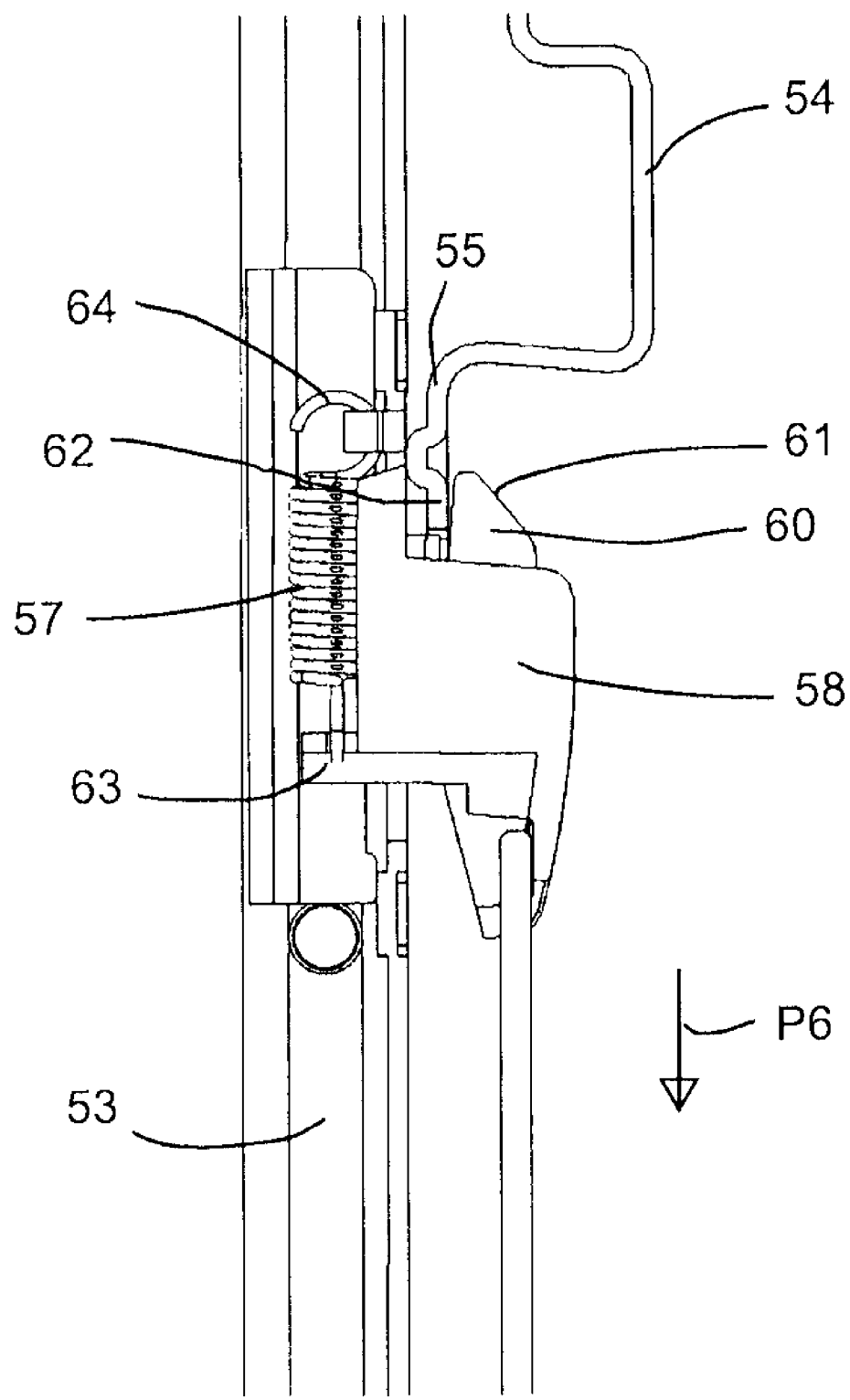
Figure 6C:
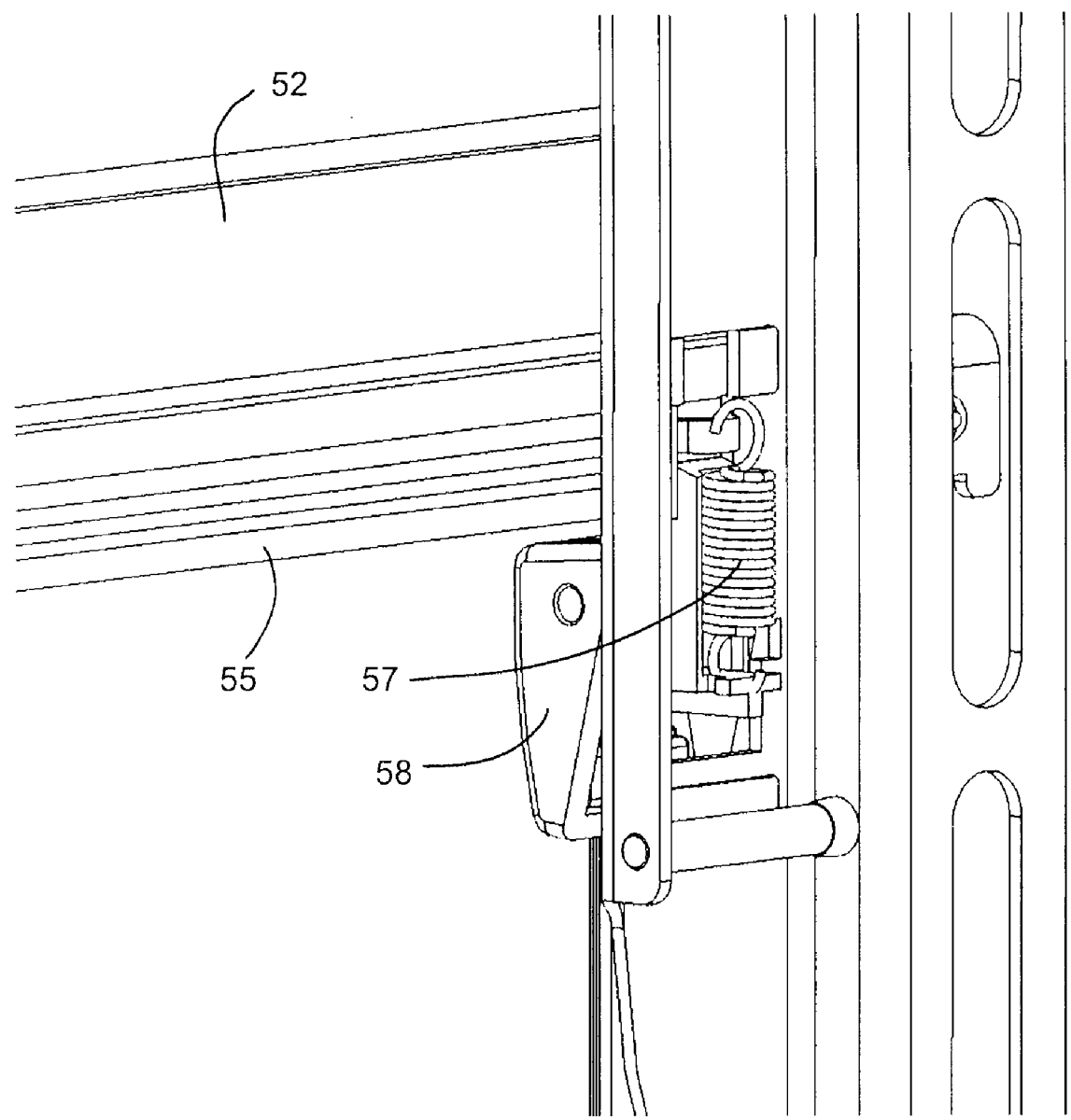
Figure 7:
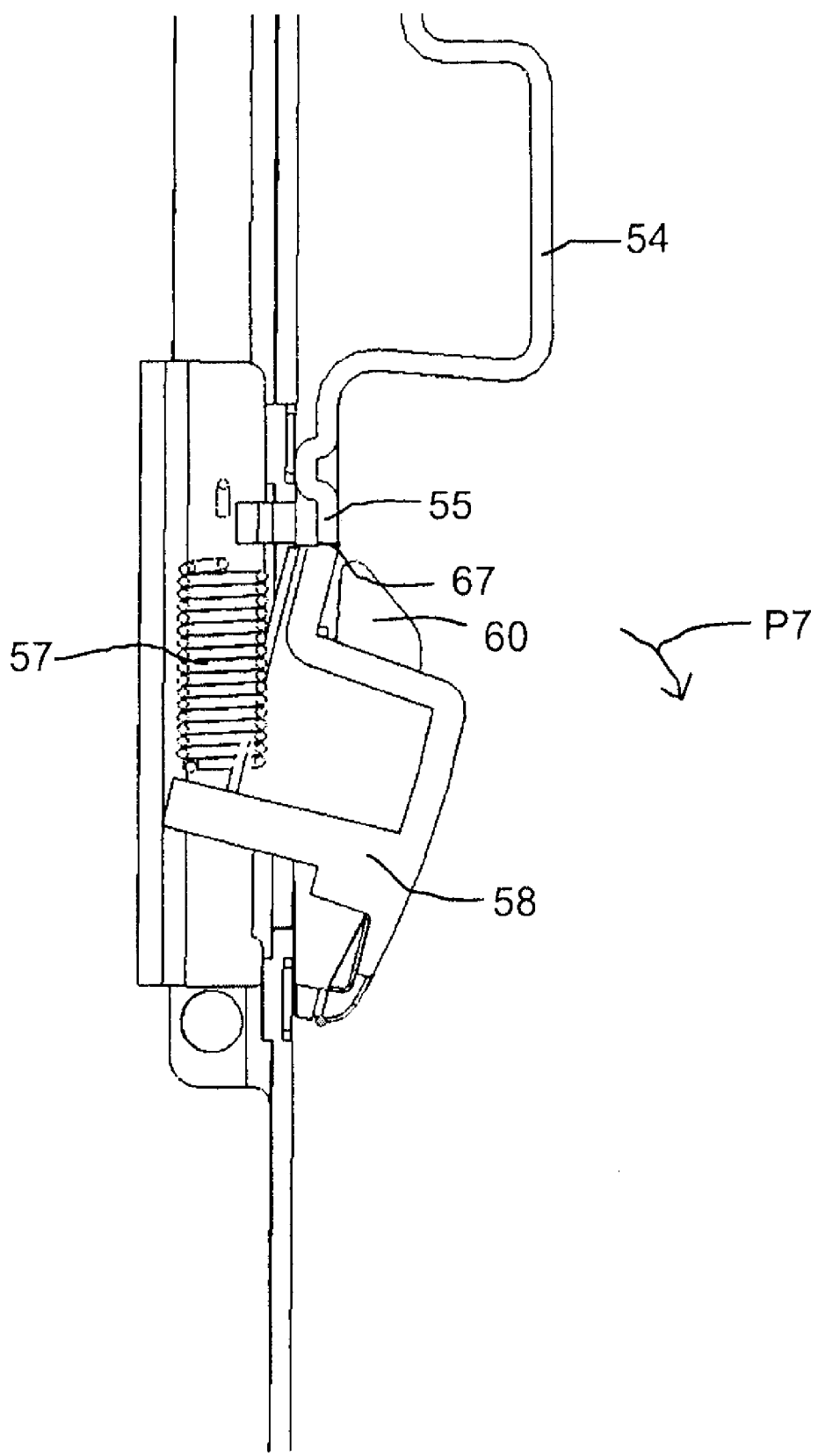
FIG. 7 is a larger-scale detail view of the device shown in FIG. 5 in a released locking position of the second hook-shaped element.
Figure 8:
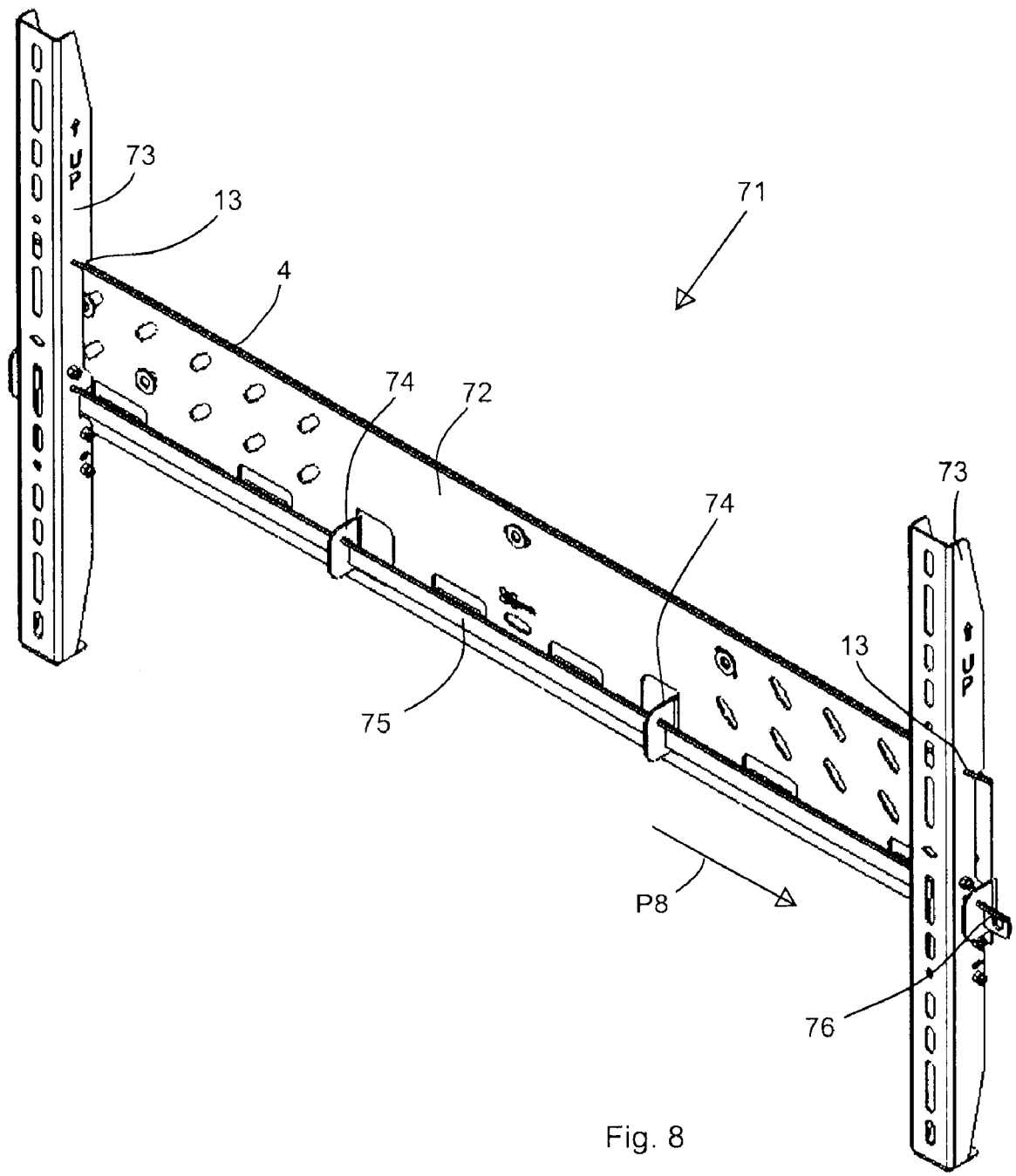
FIG. 8 is a perspective view of a fourth embodiment of a device according to the invention.
Figure 9:
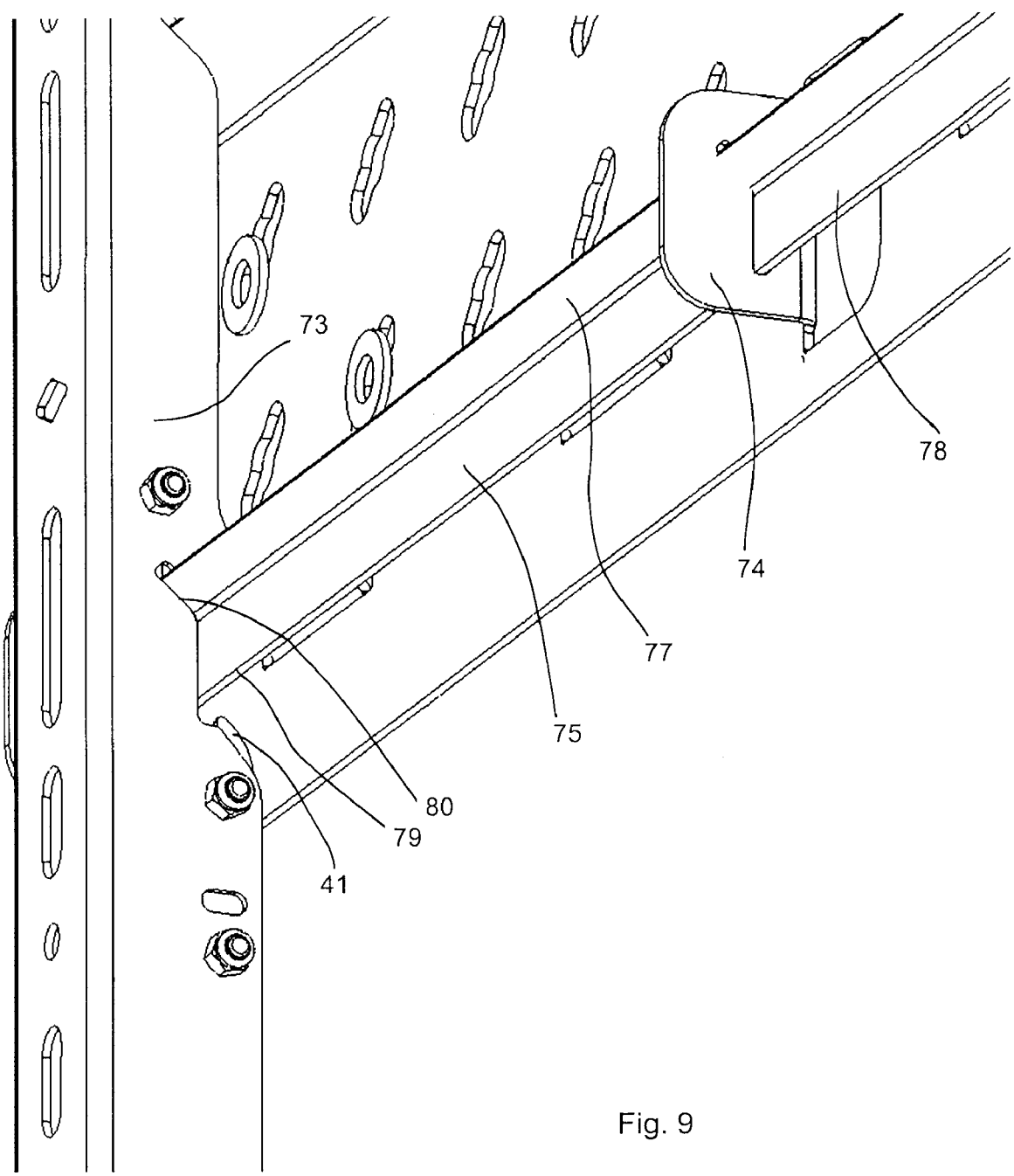
FIG. 9 is a perspective view of a detail of the device shown in FIG. 8 upon connection of the second hook-shaped element.
Figure 10:
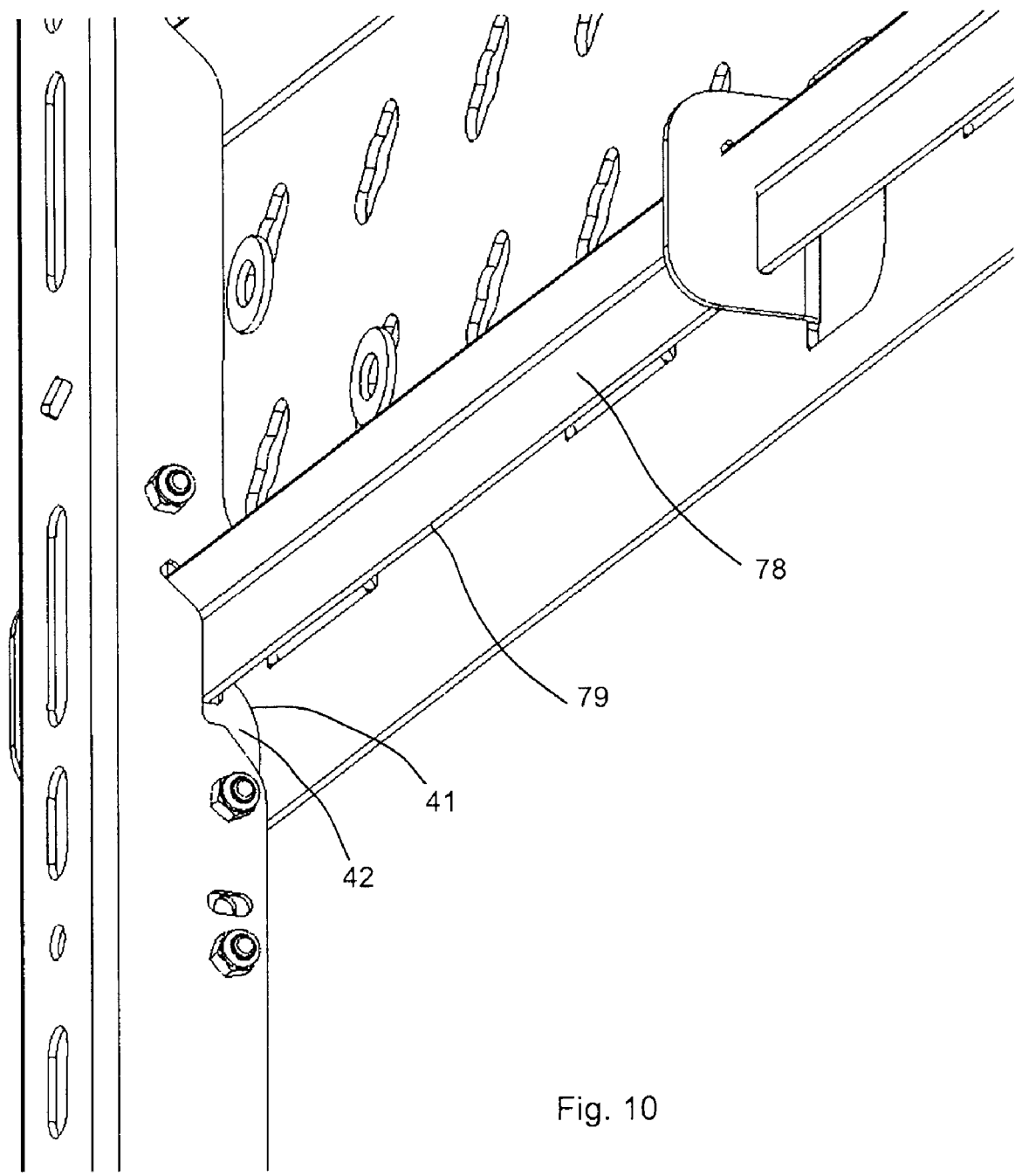
FIG. 10 is a perspective view of a detail of the device shown in FIG. 8 in a connected position of the second hook-shaped element.
Figure 11:
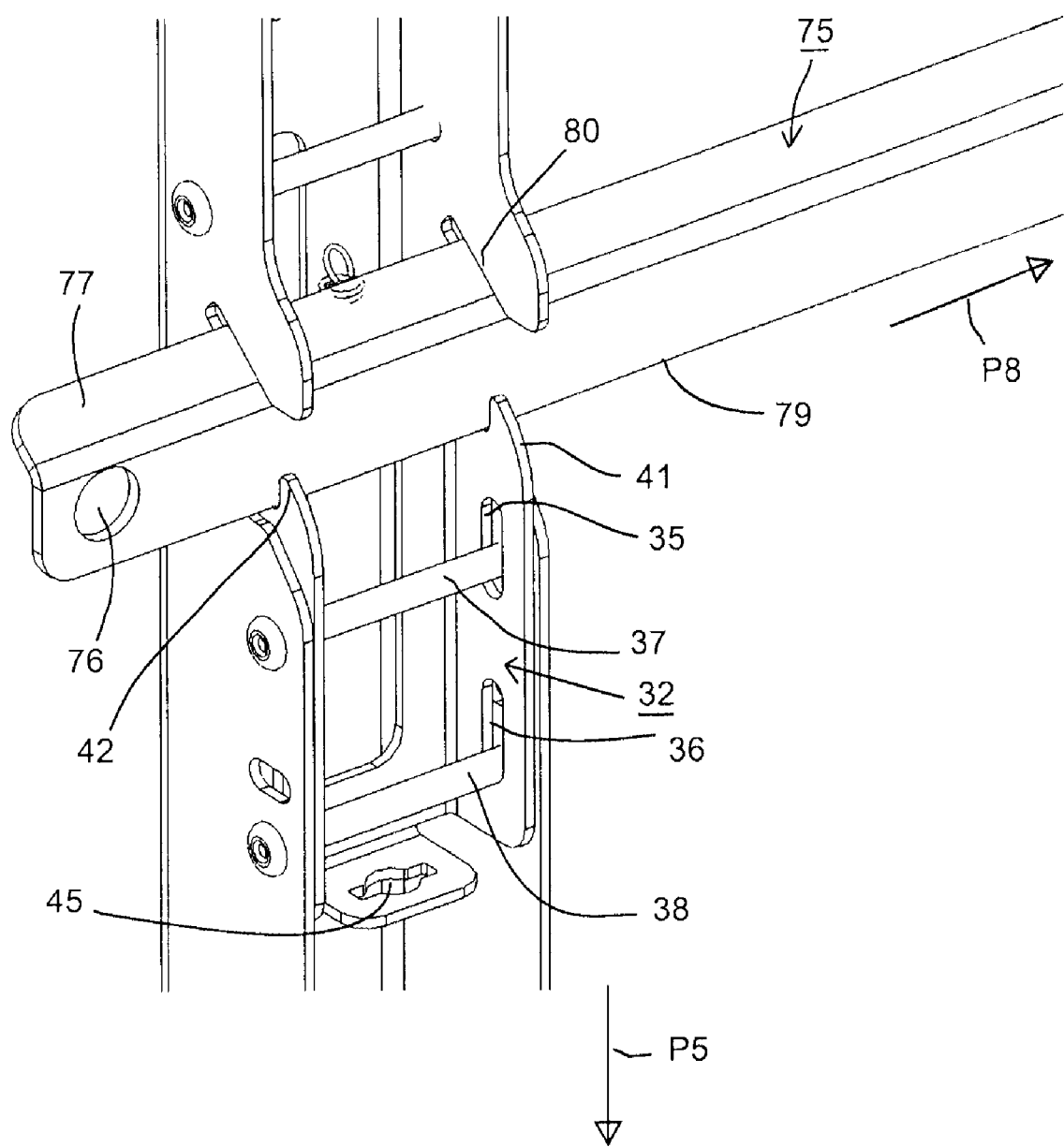
FIG. 11 is a perspective rear view of the detail shown in FIG. 10.

FIGS. 5-7 show a third embodiment of a device 51 according to the invention, which comprises a wall element 52 to be fixed to a wall and two support elements 53 connected to the wall element 52. The support elements 53 may be selectively configured as a support provided with a section tiltably connected thereto, as is the case with the device 1, or merely as a support 9, as is the case with the device 31. Near the upper side, the wall element 52 is provided with a vertically extending edge 4. At the bottom side, the wall element 52 is provided with a rib 54, via which the wall element 52 is supported against the wall. Provided on a side of the rib 54 remote from the edge 4 is a second receiving element in the form of an elongate strip 55, which is spaced from the wall. Each support element 53 is provided with a first hook-shaped element 13 located at an upper side and, spaced therefrom, a second hook-shaped element 56. The hook-shaped element 56 comprises a slide 58, which is movable against the spring force of a tension spring 57, and a cam 60, which is tiltably connected thereto about a tilt pin 59. The cam 60 comprises a run-on surface 61 directed towards the wall element 52, which includes an acute angle with the wall and with a vertically extending surface 62 adjoining the run-on surface 61. The tension spring 57 extends between a point of attachment 63 on the slide 58 and a higher point of attachment 64 on the support element 53.

To connect the support element 53 to the wall element 52, the first hook-shaped element 13 is brought into engagement with the edge 4 in a similar manner as described above. The support element 53 is then tilted in the direction of the wall element 52, causing the run-on surface 53 to come into contact with the underside of the strip 55, as a result of which a force is exerted on the run-on surface 61 in a direction indicated by the arrow P6, and consequently on the slide 58, as a consequence of which the slide 58 is moved in the direction indicated by the arrow P6 against the spring force of the spring 57. Once the cam 60 has been moved beyond the strip 55 as a result of the support element 53 being tilted further towards the wall element 52, the slide 58 will be moved in the opposite direction of the arrow P6 to the connected position shown in FIG. 6B under the influence of the spring force exerted by the spring 57. The surface 62 now abuts against a side of the strip 55 that faces the wall. To disconnect the support element 53 from the wall element 52, a user will pull a pull rod 66 connected to the slide 58 in the direction indicated by the arrow P6 until the slide 58 has been moved so far in the direction indicated by the arrow P6 that the cam 60 can be moved under the strip 55 in a direction away from the wall. As a result of a pulling force being exerted on the slide 58 by means of the pull rod 66, the slide 58 is simultaneously tilted in the direction indicated by the arrow P7 (see FIG. 7), causing a locking surface 67 of the slide 58 to be tilted towards the cam 60. The locking surface 67 is positioned higher than the upper side of the cam 60, seen in vertical direction. As a result of the combined vertical movement and tilting movement of the slide 58, the surface 66 comes to abut against the underside of the strip 55 of the wall element 52. The slide 58 is now in a locking position. A user can now disconnect the other support element 53 first, whereupon said user can tilt the display screen away from the wall element 52 once the two slides 58 are in the position shown in FIG. 7, and lift it from the edge 4. The locking position enables the user to disconnect the second hook-shaped elements first from the two receiving elements. Following that, the user can remove the display screen from the hook-shaped elements 13 without running the risk of the second hook-shaped elements returning to the connected position with the strip 55.

FIGS. 8-12 show a fourth embodiment of a device 71 according to the invention, which comprises a wall element 72 to be fixed to a wall and two support elements 73 detachably connected thereto. The wall element 72 comprises an elongate, vertically extending edge 4, to which first hook-shaped elements 13 of the support elements 73 can be connected in a manner as described in great detail in the foregoing. The wall element 72 comprises a number of brackets 74, which are provided with recesses in which an elongate strip 75 is movably accommodated. Both ends of the strip 75 are provided with openings 76, in which padlocks can be placed. In this way the strip 75 can be locked to the wall element 72 in a simple manner. The strip 75 comprises two strips 77, 78, which include an angle with each other. The strip 78 has an edge 79 at a bottom side thereof. The support element 73 is provided with a slot 80, into which the strip 77 can be positioned. The support element 73 further comprises a slide 32 as shown and explained with reference to FIGS. 4A-4C of the device 31. Connecting the support element 73 and a display screen connected thereto to the wall element 72 takes place in a similar manner as with the device 31, with the slots 80 being positioned over the strip 77 upon tilting of the support elements 73 towards the wall element 72. If desired, the support elements 73 can be unlocked in a similar manner as with the device 31, using pull rods 46. To prevent unwanted removal of the display screen from the wall element 72, for example by thieves, it is also possible, however, to leave out the lip 44 with the recess 45, or not to supply a pull rod with the device 71. Disconnecting the support elements 73 from the wall element 72 will in that case take place by removing the padlocks from the openings 76 and subsequently moving the strip 75 in the direction indicated by the arrow P8, as a result of which the connection between the slides 32 and the second receiving element in the form of the strip 75 and the edge 79 is released. A user can then simply tilt the display screen away from the wall element 72 and lift it off said wall element.

It is also possible to mount an object other than a display screen to a wall by means of the device, for example a painting, a loudspeaker, etc.

It is also possible to have the edges 4, 5 extend in vertical direction.

It is possible to provide the wall element with stops near ends thereof, which stops prevent the support element from being moved off the wall element when the support element is being moved in the longitudinal direction of the wall element.

The invention claimed is:

1. A device suitable for securing an object to a wall, which device comprises a wall element to be fixed to a wall and a support element to be connected to the object, which support element is provided with a first hook-shaped element on a first side thereof, which, in use, can be attached to a first receiving element provided in the wall element, which support element is provided with a second hook-shaped element on a second side remote from said first side, which second hook-shaped element can be moved in a direction towards the first hook-shaped element under spring force, and which, in use, is in spring-loaded engagement with a second receiving element provided in the wall element, characterised in that the device comprises a locking element for locking the second hook-shaped element in a locking position in a position in which it is disconnected from the wall element.

2. A device according to claim 1, characterised in that the hook-shaped element can be connected to a pull element for moving the second hook-shaped element against spring force in a direction away from the first hook-shaped element.

3. A device according to claim 1, characterised in that the first and/or the second receiving element comprise(s) an elongate edge, with which the hook-shaped element is in engagement in use, the length of said elongate edge being at least twice the width of the hook-shaped element.

4. A device according to claim 1, characterised in that the second hook-shaped element comprises a slide which is mounted for sliding as well as tilting movement with respect to the support element, which slide is movable from a first position, in which it is disconnected from the wall element, to a second position, in which it is connected to the second receiving element, and vice versa, in which first position the slide is spaced from the first hook-shaped element and tilts towards the wall element under spring force, whilst in the second position the slide tilts away from the wall element and is positioned closer to the first hook-shaped element.

5. A device according to claim 4, characterised in that the slide is provided with a tilt pin which is slidably supported in a slot in the support element, which slot extends towards the first hook-shaped element, which slide is further provided with an L-shaped slot, in which a guide pin connected to the support element is accommodated, which slide is tiltable about said tilt pin from the first position, in which the guide pin is located near a first end of said L-shaped slot, to a second position, in which the guide pin is located near a second end of the L-shaped slot, and vice versa.

6. A device according to claim 5, characterised in that the guide pin is positioned closer to the first hook-shaped element than the tilt pin, whilst a tension spring extends between the tilt pin and the guide pin.

7. A device according to claim 4, characterised in that the slide is provided with a stop on a side remote from the tilt pin, wherein contact between the stop and the wall element and/or the wall in use causes the slide to be tilted about the tilt pin.

8. A device according to claim 4, characterised in that the slide can be tilted to the locking position.

9. A device according to claim 1, characterised in that the second receiving element comprises an elongate strip, which is movably supported in the wall element, which strip is movable between a receiving position, in which the second hook-shaped element can be brought into engagement with the strip, to a releasing position, in which the second receiving element is out of engagement with the strip.

10. A device according to claim 9, characterised in that said strip can be interlocked with the wall element.

11. A device according to claim 1, characterised in that the second hook-shaped element comprises a slide which is movable under spring force in a direction of movement towards the first hook-shaped element, which slide is provided with a run-on surface which includes an angle with the direction of movement, wherein contact between the run-on surface and the second receiving element in use causes the slide to be moved in a direction opposite the direction of movement until the run-on surface is located on a side of the second receiving element remote from the support element, whereupon the slide is moved towards the first hook-shaped element under spring force and brought into engagement with the second receiving element.

* * * * *